(12) United States Patent
Kolaitis et al.

(10) Patent No.: US 11,695,734 B2
(45) Date of Patent: *Jul. 4, 2023

(54) ROTATING INTERNET PROTOCOL ADDRESSES IN A VIRTUAL PRIVATE NETWORK

(71) Applicant: Oversec, UAB, Vilnius (LT)

(72) Inventors: Tomas Kolaitis, Kaunas (LT); Vytautas Neubauer, Isorai (LT)

(73) Assignee: Oversec, UAB, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,749

(22) Filed: Feb. 26, 2022

(65) Prior Publication Data

US 2023/0006972 A1 Jan. 5, 2023

Related U.S. Application Data

(63) Continuation of application No. 17/367,346, filed on Jul. 3, 2021, now Pat. No. 11,297,038.

(51) Int. Cl.
*H04L 9/40* (2022.01)
*H04L 61/5061* (2022.01)
*H04L 67/01* (2022.01)

(52) U.S. Cl.
CPC ...... *H04L 63/0272* (2013.01); *H04L 61/5061* (2022.05); *H04L 63/0414* (2013.01); *H04L 67/01* (2022.05)

(58) Field of Classification Search
CPC . H04L 63/0272; H04L 63/0414; H04L 67/01; H04L 61/5061
See application file for complete search history.

(56) References Cited

U.S. PATENT DOCUMENTS

| | | |
|---|---|---|
| 7,283,534 B1 | 10/2007 | Kelly et al. |
| 9,686,238 B1 * | 6/2017 | Row, II ................... H04L 12/06 |
| 10,243,922 B2 | 3/2019 | Bifulco et al. |
| 10,257,167 B1 * | 4/2019 | Matthews ........... H04L 12/4641 |
| 10,320,753 B1 | 6/2019 | Ashley et al. |
| 10,601,779 B1 | 3/2020 | Matthews et al. |
| 10,721,097 B2 * | 7/2020 | Nandoori .............. H04L 47/125 |
| 10,972,427 B1 | 4/2021 | Hu |
| 10,972,436 B1 | 4/2021 | Simanel et al. |
| 11,140,132 B1 * | 10/2021 | Samaha .............. H04L 63/0227 |
| 11,190,491 B1 | 11/2021 | Kaciulis et al. |
| 11,438,302 B1 * | 9/2022 | Majkowski ......... H04L 61/5069 |
| 2002/0126667 A1 | 9/2002 | Oguchi |
| 2008/0034092 A1 | 2/2008 | Kikuchi et al. |

(Continued)

*Primary Examiner* — Blake J Rubin
(74) *Attorney, Agent, or Firm* — The Pattani Law Group

(57) ABSTRACT

A method including receiving, at a first VPN server during an established VPN connection, a first data request and a second data request from a user device; transmitting, by the first VPN server during the established VPN connection, the first data request to a second VPN server and the second data request to a third VPN server; receiving, by the first VPN server from the second VPN server during the established VPN connection, first data associated with the first data request; and receiving, by the first VPN server from the third VPN server during the established VPN connection, second data associated with the second data request, the second exit IP address being different from the first exit IP address. Various other aspects are contemplated.

20 Claims, 8 Drawing Sheets

(56) References Cited

U.S. PATENT DOCUMENTS

| | | |
|---|---|---|
| 2009/0144817 A1 | 6/2009 | Kumar et al. |
| 2009/0276314 A1 | 11/2009 | Gorodyansky et al. |
| 2013/0212249 A1 | 8/2013 | Groat et al. |
| 2014/0344917 A1* | 11/2014 | Parla .................. H04L 63/0272 709/245 |
| 2015/0067819 A1 | 3/2015 | Shribman et al. |
| 2016/0014083 A1* | 1/2016 | Mower .................. H04L 45/44 726/13 |
| 2016/0087941 A1* | 3/2016 | Mudigonda ......... H04L 12/4641 726/12 |
| 2016/0226815 A1* | 8/2016 | Wan .................... H04L 61/2521 |
| 2016/0277359 A1 | 9/2016 | Karunakaran et al. |
| 2017/0012937 A1* | 1/2017 | Dinha ................. H04L 61/2592 |
| 2017/0054758 A1 | 2/2017 | Maino et al. |
| 2017/0078336 A1 | 3/2017 | Aluvala et al. |
| 2017/0086092 A1* | 3/2017 | Kim .................... H04L 45/306 |
| 2017/0093891 A1 | 3/2017 | Mitchell |
| 2017/0099159 A1* | 4/2017 | Abraham ............. H04L 65/102 |
| 2017/0111269 A1 | 4/2017 | Baumgartner et al. |
| 2017/0171156 A1 | 6/2017 | Schultz et al. |
| 2017/0171158 A1* | 6/2017 | Hoy .................... H04L 63/102 |
| 2017/0237735 A1 | 8/2017 | Johnson et al. |
| 2017/0279803 A1 | 9/2017 | Desai et al. |
| 2017/0366508 A1 | 12/2017 | Saraf |
| 2018/0013583 A1 | 1/2018 | Rubenstein et al. |
| 2018/0048588 A1 | 2/2018 | Beesley et al. |
| 2018/0309658 A1* | 10/2018 | Parla .................. H04L 63/0272 |
| 2019/0158397 A1* | 5/2019 | Liu ..................... H04L 12/4633 |
| 2019/0372937 A1* | 12/2019 | Song .................. H04L 63/0227 |
| 2020/0007507 A1 | 1/2020 | Zhu et al. |
| 2020/0092328 A1 | 3/2020 | Kim et al. |
| 2020/0314067 A1 | 10/2020 | Rudnik |
| 2020/0336409 A1* | 10/2020 | Branch ................ H04L 45/124 |
| 2021/0058399 A1 | 2/2021 | Kapoor et al. |
| 2021/0099431 A1 | 4/2021 | Wasicek et al. |
| 2021/0344651 A1* | 11/2021 | Joshi .................. H04L 12/4633 |
| 2021/0392076 A1 | 12/2021 | Prodoehl et al. |
| 2021/0400425 A1* | 12/2021 | Allasia ................ H04W 12/72 |
| 2022/0337480 A1* | 10/2022 | Vanajakshi ............ H04L 41/16 |

\* cited by examiner

ROTATING INTERNET PROTOCOL ADDRESSES IN A VIRTUAL PRIVATE NETWORK

CROSS REFERENCE

This application is a continuation of U.S. Non-Provisional patent application Ser. No. 17/367,346, filed on Jul. 3, 2021, and titled "Rotating Internet Protocol Addresses In A Virtual Private Network," the entire contents of which are incorporated herein by reference.

FIELD OF DISCLOSURE

Aspects of the present disclosure generally relate to a virtual private network (VPN), and more particularly to rotating exit internet protocol (IP) addresses via a VPN server.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded, unreadable format with help of an encryption algorithm. Decryption may be associated with changing the data from being in the encoded, unreadable format to being in the transparently readable format with help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the stronger is the encryption.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

SUMMARY

In one aspect, the present disclosure contemplates a method for rotating internet protocol (IP) addresses in a virtual private network (VPN), the method comprising receiving, at a first VPN server, a first data request and a second data request during an established VPN connection between a user device and a second VPN server; retrieving, during the established VPN connection, first data associated with the first data request using a first exit IP address; and retrieving, during the established VPN connection, second data associated with the second data request using a second exit IP address, different from the first exit IP address.

In another aspect, the present disclosure contemplates a device associated with a virtual private network (VPN), the device comprising a memory; and a processor communicatively coupled to the memory, the processor being configured to: receive, at a first VPN server, a first data request and a second data request during an established VPN connection between a user device and a second VPN server; retrieve, during the established VPN connection, first data associated with the first data request using a first exit IP address; and retrieve, during the established VPN connection, second data associated with the second data request using a second exit IP address, different from the first exit IP address.

In another aspect, the present disclosure contemplates a non-transitory computer readable medium storing instructions, which when executed by a processor cause the processor to: receive, at a first VPN server, a first data request and a second data request during an established VPN connection between a user device and a second VPN server; retrieve, during the established VPN connection, first data associated with the first data request using a first exit IP address; and retrieve, during the established VPN connection, second data associated with the second data request using a second exit IP address, different from the first exit IP address.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
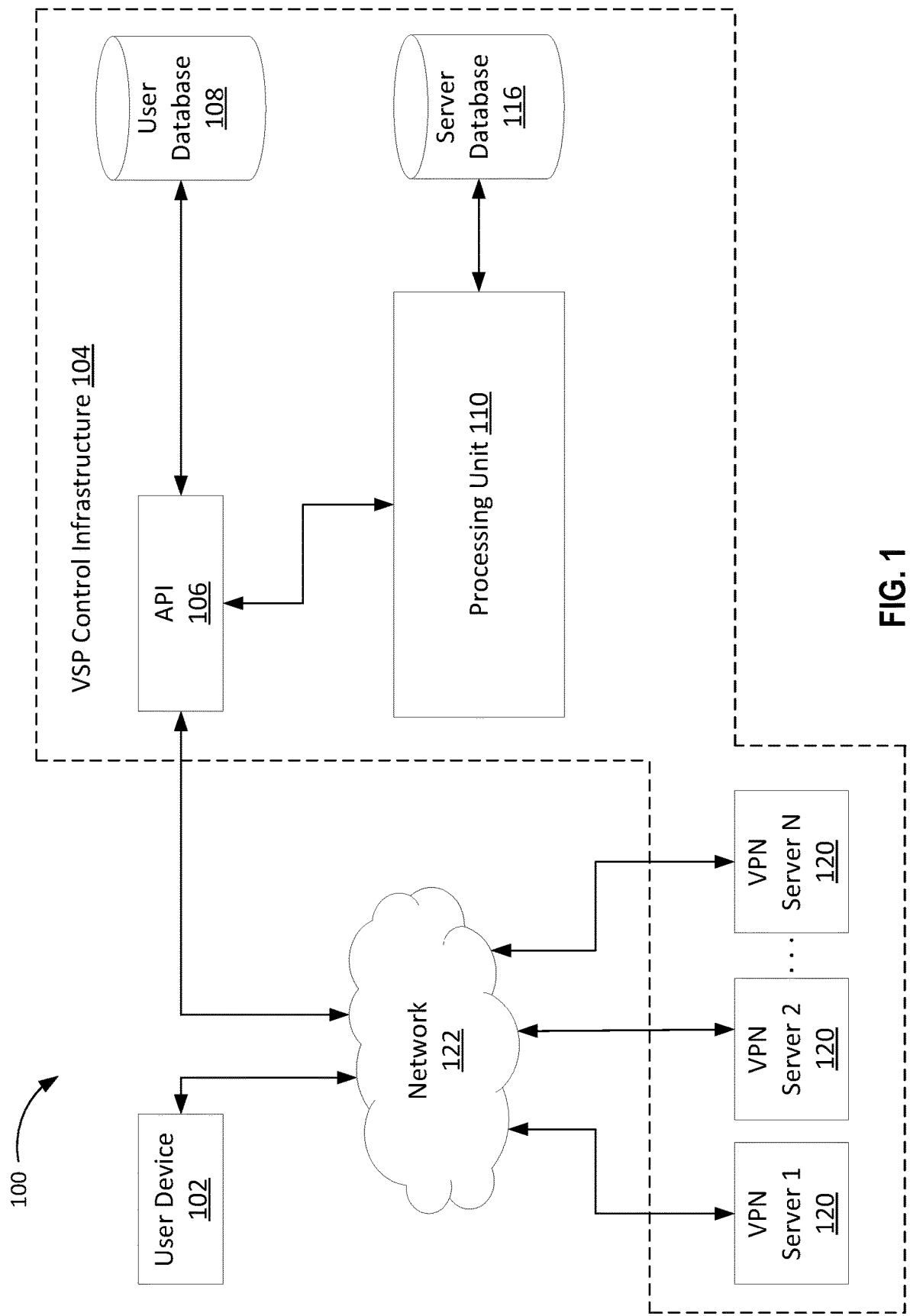

FIG. 1 is an illustration of an example system associated with rotating exit IP addresses in a VPN, according to various aspects of the present disclosure.

Figure 2:
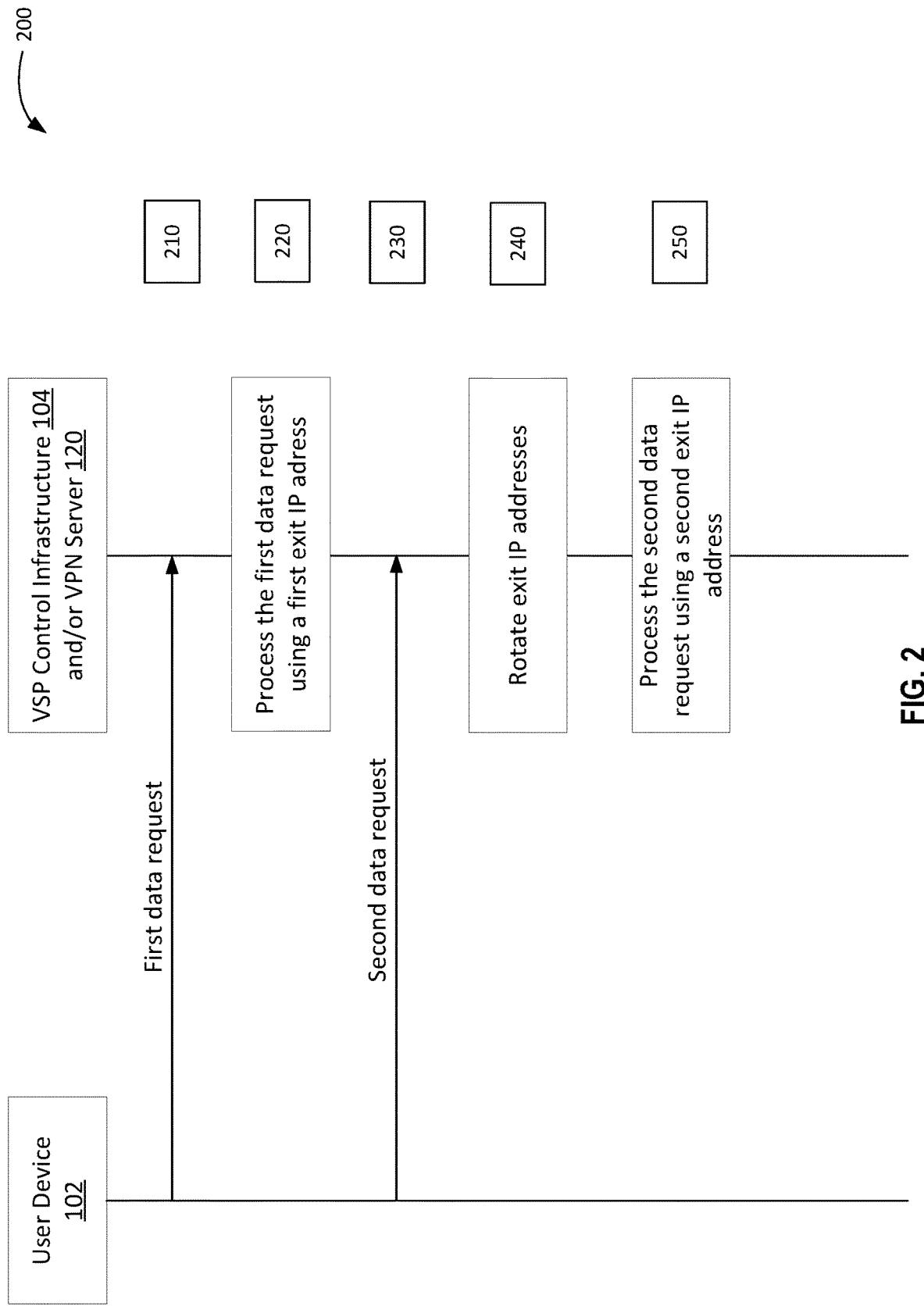

FIG. 2 is an illustration of an example flow associated with rotating exit IP addresses in a VPN, according to various aspects of the present disclosure.

Figure 3:
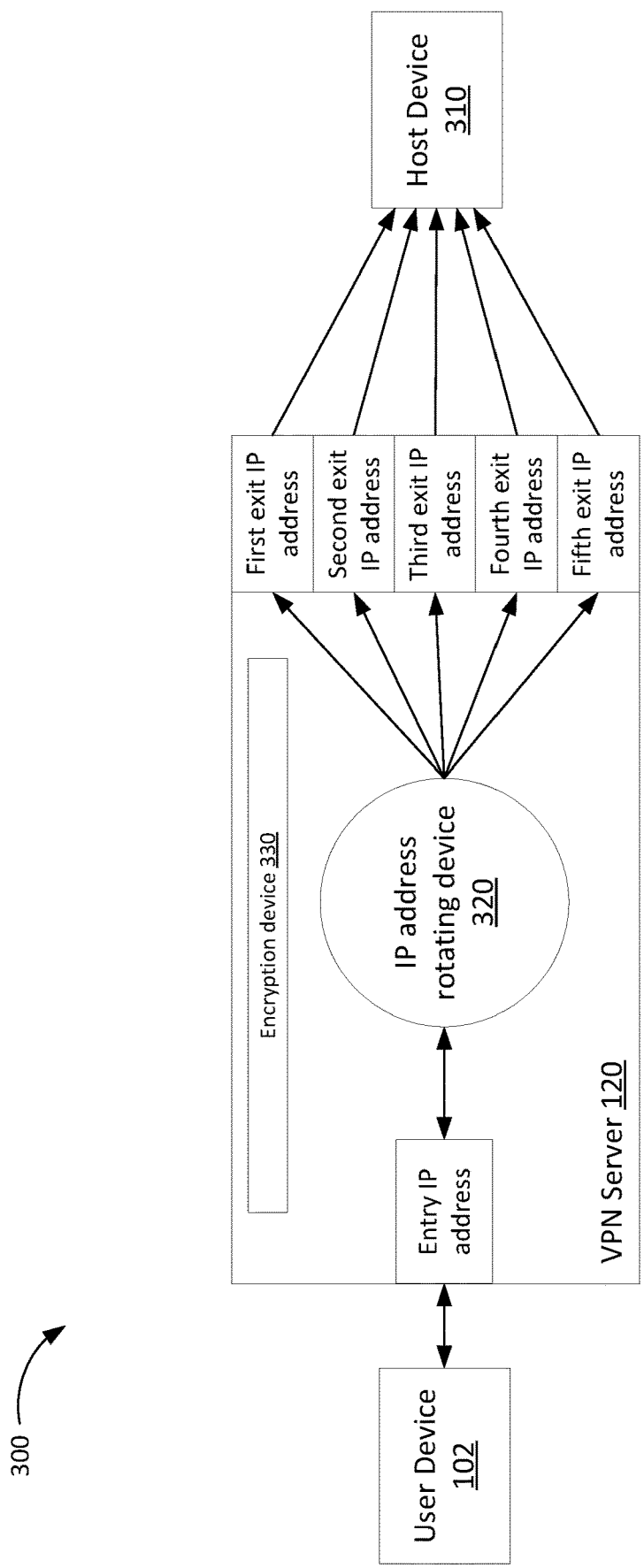

FIG. 3 is an illustration of an example associated with rotating exit IP addresses in a VPN, according to various aspects of the present disclosure.

Figure 4:
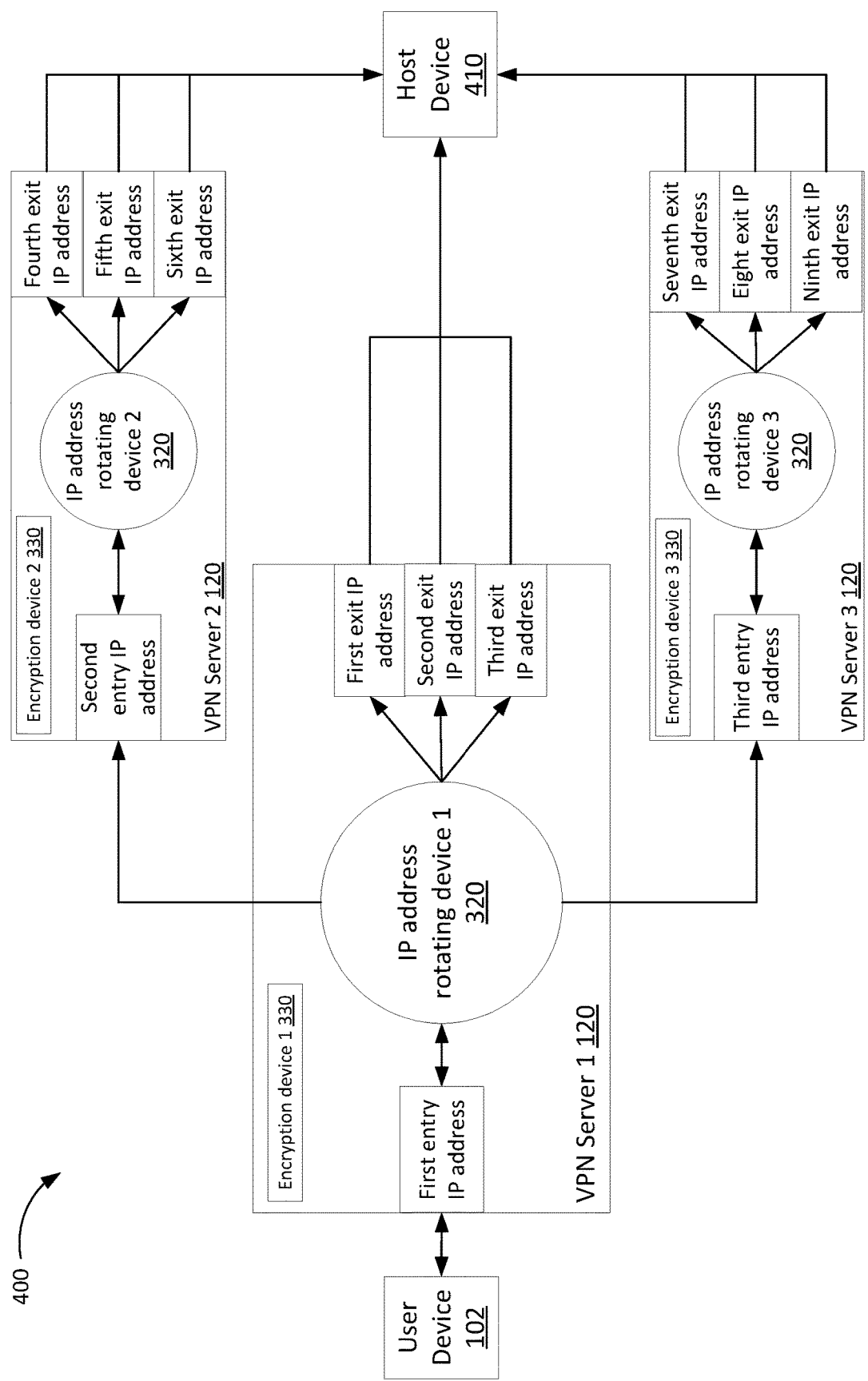

FIG. 4 is an illustration of an example associated with rotating exit IP addresses in a VPN, according to various aspects of the present disclosure.

Figure 5:
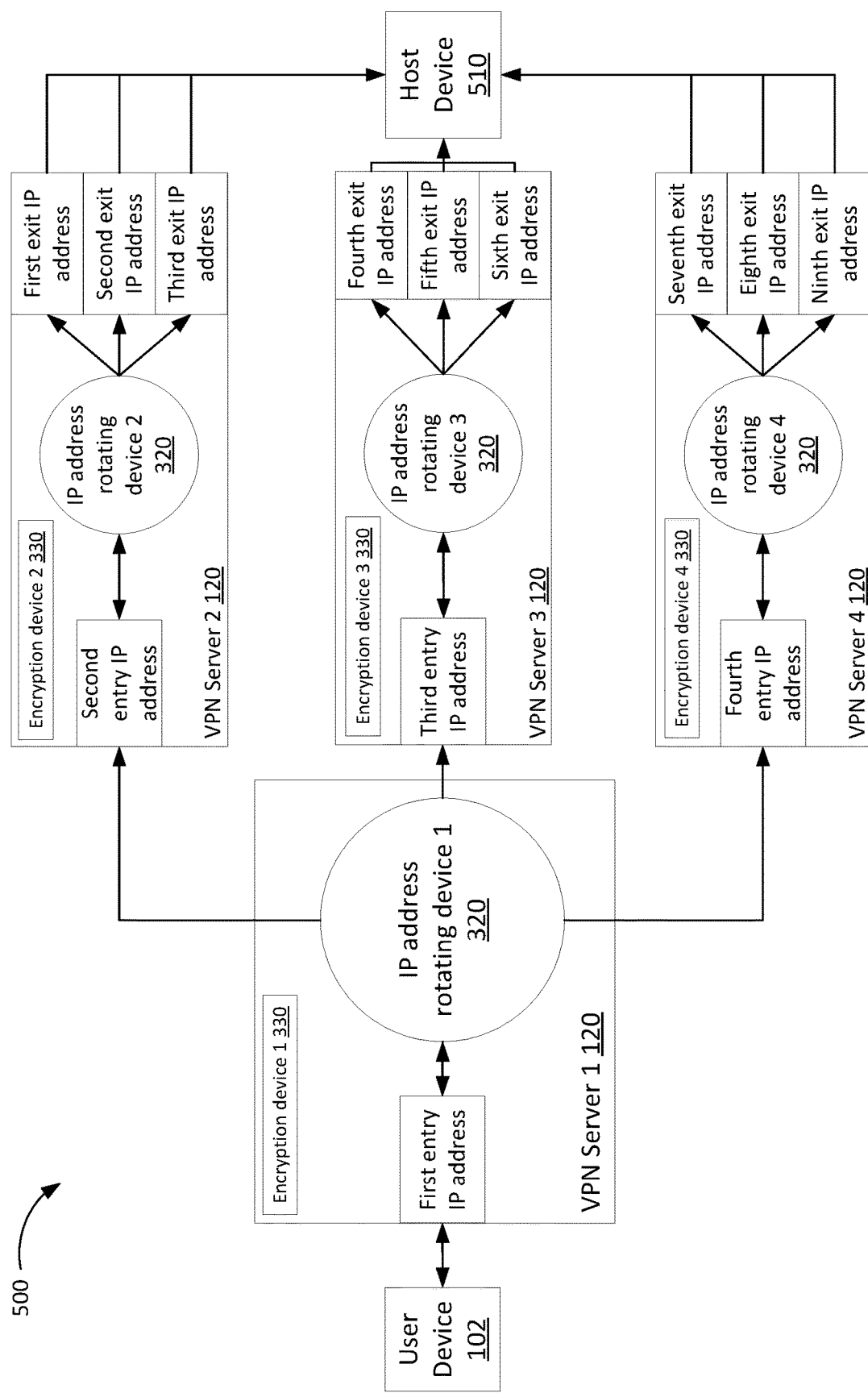

FIG. 5 is an illustration of an example associated with rotating exit IP addresses in a VPN, according to various aspects of the present disclosure.

Figure 6:
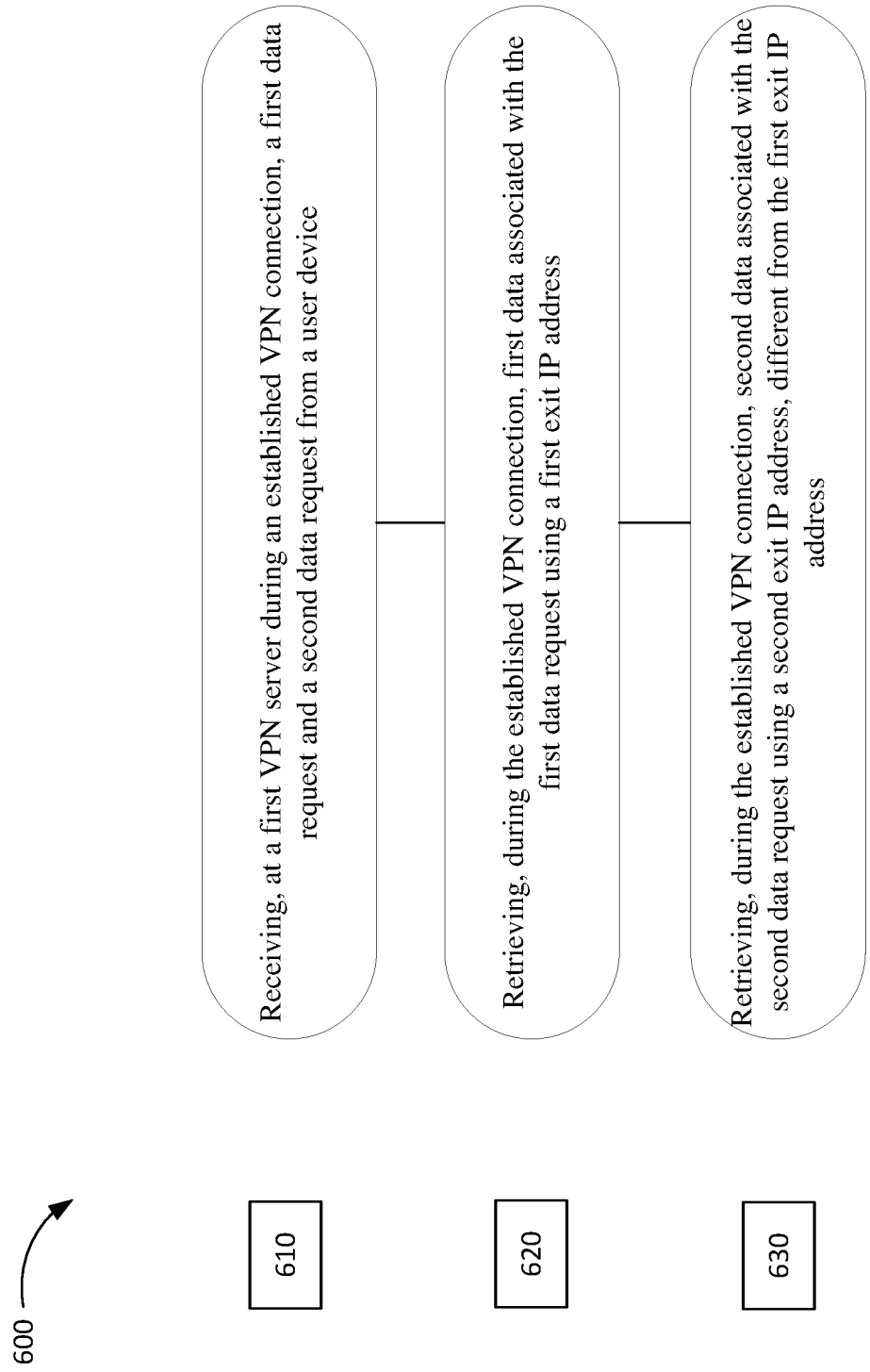

FIG. 6 is an illustration of an example process associated with rotating exit IP addresses in a VPN, according to various aspects of the present disclosure.

Figure 7:
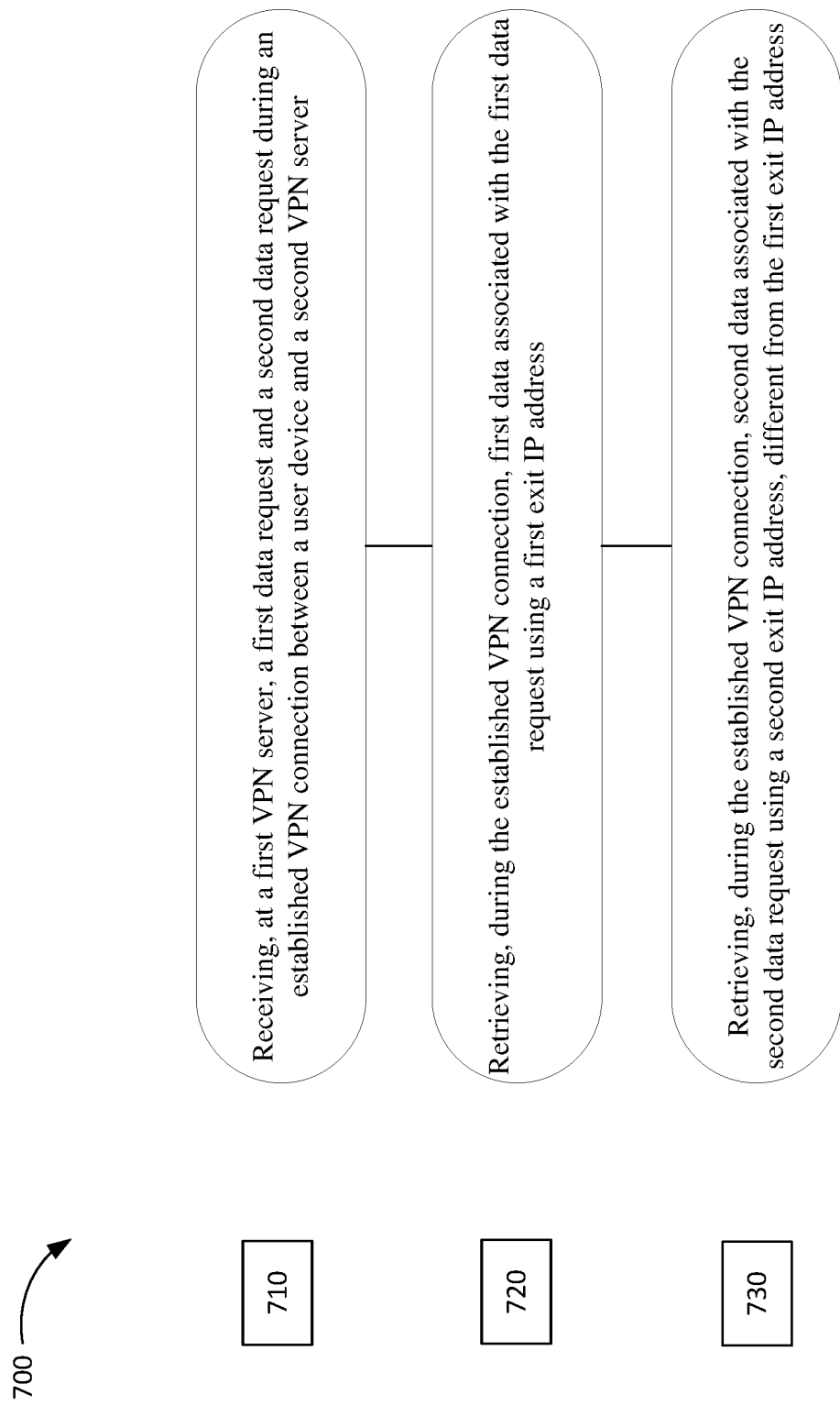

FIG. 7 is an illustration of an example process associated with rotating exit IP addresses in a VPN, according to various aspects of the present disclosure.

Figure 8:
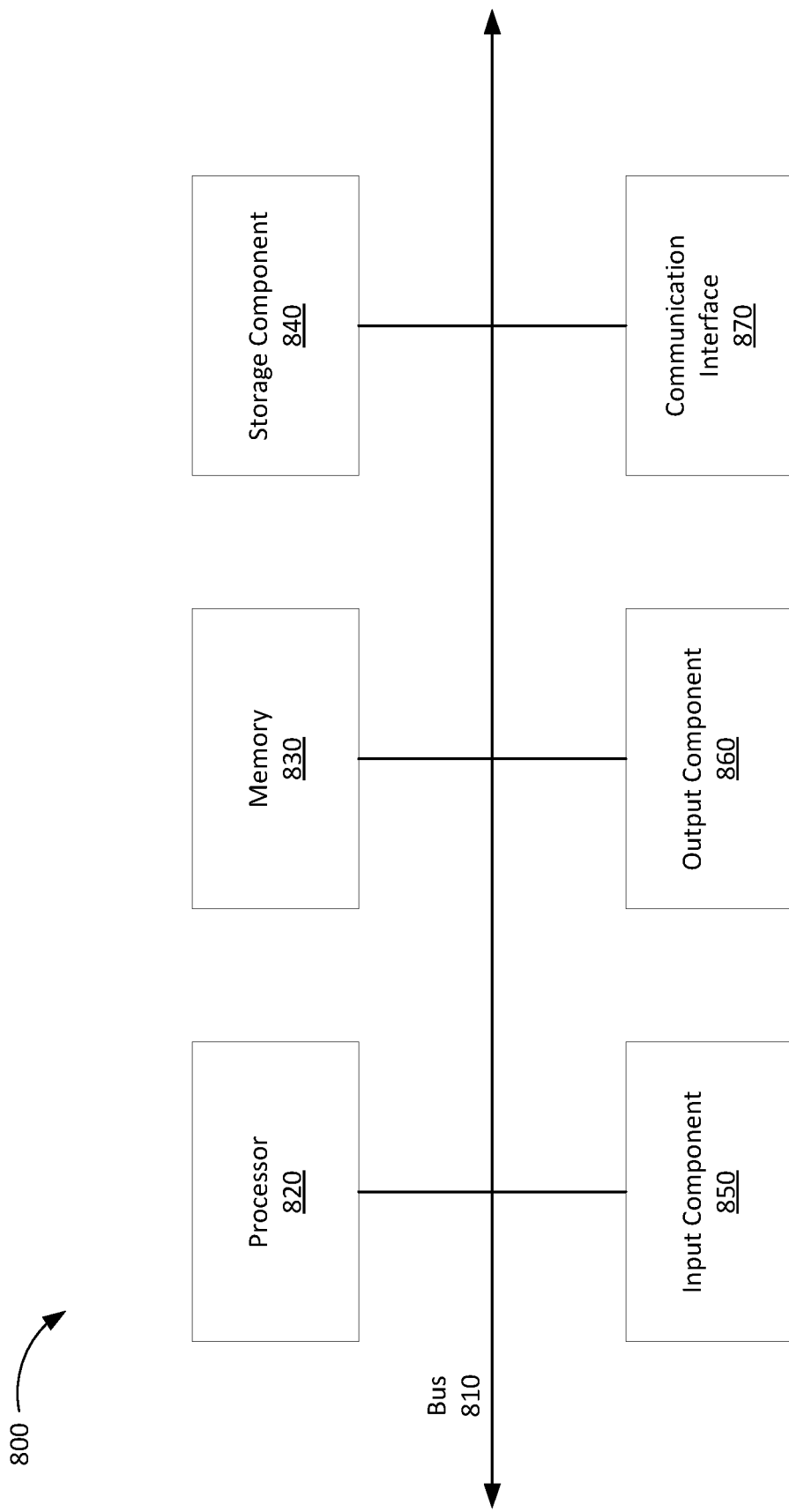

FIG. 8 is an illustration of example devices associated with rotating exit IP addresses in a VPN, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with rotating exit IP addresses in a VPN, according to various aspects of the present disclosure. Example 100 shows an architectural depiction of components included in system 100. In some aspects, the components may include a user device 102 capable of communicating with one or more VPN servers 120 and with a VPN service provider (VSP) control infrastructure 104 over a network 122. The VSP control infrastructure 104 may be controlled by a VPN service provider and may include an application programming interface (API) 106, a user database 108, processing unit 110, a server database 116, and the one or more VPN servers 120. As shown in FIG. 1, the API 106 may be capable of communicating with the user database 108 and with the processing unit 110. Additionally, the processing unit 110 may be capable of communicating with the server database, which may be capable of communicating with a testing module (not shown). The testing module may be capable of communicating with the one or more VPN servers 120 over the network 122. The processing unit 110 may be capable of controlling operation of the one or more VPN servers 120.

The user device 102 may be a physical computing device capable of hosting a VPN application and of connecting to the network 122. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 122 may be any digital telecommunication network that permits several nodes to share and access resources. In some aspects, the network 122 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 122, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The VPN service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may provide VPN services to the user device 102. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 may a request for an IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal server or IP addresses of the VPN servers 120 included in the list to the user device 102. In the case where the list of IP addresses of the VPN servers 120 is provided, the user device 102 may have an option to select a single VPN server 120 from among the listed VPN servers as the optimal server 120. The user device 102 may establish a VPN connection (e.g., an encrypted tunnel) with the optimal VPN server. In some aspects, the optimal VPN server with which the user device establishes the encrypted tunnel may be referred to as a primary VPN server or an entry VPN server. In some aspects, a VPN server 120 may be a piece of physical or virtual computer hardware and/or software capable of securely communicating with (the VPN application on) the user device 102 for provision of VPN services.

The processing unit 110 may be a logical unit including a scoring engine 112. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120.

In some aspects, based at least in part on server penalty scores calculated via the complex operations and/or the arithmetical and logical operations, the processing unit 110 may determine an optimal VPN server. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

One or more components (e.g., API 106, user database 108, processing unit 110, and/or server database 116) included in the VSP control infrastructure 104 may further be associated with a controller/processor, a memory, or a combination thereof. For instance, the one or more components of the set of components may include or may be included in a controller/processor, a memory, or a combination thereof. In some aspects, the one or more of the components included in the VSP control infrastructure 104 may be separate and distinct from each other. Alternatively, in some aspects, one or more of the components included in the VSP control infrastructure 104 may be combined with one or more of other components included in the VSP control infrastructure 104. In some aspects, the one or more of the components included in the VSP control infrastructure 104 may be local with respect to each other. Alternatively, in some aspects, one or more of the components included in the VSP control infrastructure 104 may be located remotely with respect to one or more of other components included in the VSP control infrastructure 104. Additionally, or alternatively, one or more components of the components included in the VSP control infrastructure 104 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

A user device may establish a VPN connection (e.g., encrypted tunnel) with a VPN server. Based at least in part on establishing the VPN connection using an entry IP address of the VPN server, a VSP control infrastructure, responsible for managing the primary VPN server, and/or the VPN server may assign an exit IP address associated with the VPN server to the user device.

During a given established VPN connection (e.g., while the given VPN connection remains established), the VPN server may use the entry IP address and/or the exit IP address to process requests received from the user device. For instance, during the given established VPN connection, the VPN server may use the entry IP address to receive a request for, for example, retrieving data of interest and may use the exit IP address to retrieve the data of interest on the open internet. For example, the VPN server may use the exit IP address to query one or more host devices to retrieve the data of interest. Further, the VPN server may utilize a correlation between the exit IP address and the entry IP address to provide (e.g., route) the retrieved data of interest to the user device. During the given established VPN connection, the VPN server may use the same entry IP address and the same exit IP address to process requests from the user device.

Because the VPN server may use the same exit IP address during the given established VPN connection, private information associated with the user device (e.g., a location of the user device, a list of websites visited by the user device, a nature of data requested by the user device, or the like) may be compromised (e.g., traced (i.e., identified) and collected). In one example, a host device may include a text file (e.g., a cookie) in the requested data, which text file may enable the host device to track the exit IP address and discover a list of websites visited by the user device. In another example, the host device may analyze information included in a query (e.g., the exit IP address, a user-agent header, or the like) to determine a location of the user device. In yet another example, third-party trackers may use tracker cookies that may enable the third-party trackers to track the exit IP address and to collect the private information associated with the user device. As a result, privacy of the user device may be compromised, and the user device may be unable to, among other things, privately send and receive data across public networks.

Various aspects of systems and techniques discussed in the present disclosure enable rotating exit IP addresses in a VPN. In some aspects, a user device may establish a VPN connection (e.g., encrypted tunnel) with a VPN server. During the established VPN connection, the techniques discussed herein may enable the VPN server (and/or an associated VSP control infrastructure) to assign, to the user device, an exit IP address that may be used to process a data request received from the user device. Further, during the established VPN connection, the techniques may enable the VPN server to rotate exit IP addresses by assigning another exit IP address for processing another data request received from the user device. In this way, the VPN server may assign a plurality of exit IP addresses to the user device during the established VPN connection. In some aspects, the VPN server may assign a respective exit IP address to process respective data requests received from the user device during the established VPN connection. By assigning a plurality of exit IP addresses during the established VPN connection, the VPN server can deter tracking of exit IP addresses and, thereby, mitigate instances of private information associated with the user device (e.g., a location of the user device, a list of websites visited using the user device, a nature of data requested by the user device, or the like) becoming compromised. As a result, the user device may, among other things, protect its privacy and/or privately send and receive data across public networks.

Rotating exit IP addresses may be associated with assigning different exit IP addresses to a user device during the established VPN connection. The different exit IP addresses may be selected from among a plurality of exit IP addresses included in a pool of exit IP addresses available to a primary VPN server. In some aspects, a first exit IP address may be assigned to a user device to be used by the VPN server to process a first data request and a second, different exit IP address may be assigned to the user device to be used by the VPN server to process a second data request. In some aspects, the first data request and the second data request may be processed in a single socket established between the VPN server and a host device. In some aspects, the first data request may be processed in a first socket and the second data request may be processed in a second, different socket. In some aspects, processing a data request may involve retrieving data of interest associated with or requested via the data request. In some aspects, one or more of the different exit IP addresses may be related to one or more entry IP addresses of another VPN server.

FIG. 2 is an illustration of an example flow 200 associated with rotating exit IP addresses in a VPN, according to various aspects of the present disclosure. Example flow 200 includes a user device 102 in communication with a VPN server 120. In some aspects, the user device 102 may communicate with the VPN server 120 over a network (e.g., network 122). In some aspects, the VPN server 120 may be a primary VPN server.

The user device 102 may be in communication with the VPN server 120 based at least in part on establishing a VPN connection with the VPN server 120. In some aspects, the established VPN connection may use a VPN protocol such as, for example, Wireguard, IKEv2, OpenVPN, or the like.

Based at least in part on establishing the VPN connection, the VPN server 120 may assign an entry IP address and an exit IP address (e.g., first exit IP address) to the user device 102. The entry IP address may be private to the VPN server 120 and may be associated with a local subnetwork (subnet) configured by the primary VPN server for the user device 102. In some aspects, the VPN server 120 may assign and IPv4 entry IP address and an IPv6 entry IP address to the user device 102. The exit IP address may be selected from among a plurality of exit IP addresses included in a pool of exit IP addresses available to the VPN server 120.

In some aspects, the exit IP address may be randomly selected or sequentially selected from among the plurality of exit IP addresses included in the pool of exit IP addresses. Randomly selecting or sequentially selecting an exit IP address may include selecting an exit IP address according to, for example, an inverse sequential order, a random sequential (random but higher) order, a random inverse (random but lower) order, a random non-sequential (random but not next) order, a two-step (random and then next) order, a random including current exit IP address order, a sequential discreet (at least n+2 steps, with n being an integer), and/or a random lower bound (random but only within a upper half, upper quartile, etc.) order.

In some aspects, the VPN server 120 may utilize an nftable firewall to assign exit IP addresses. In some aspects, the VSP control infrastructure 104 (e.g., processing unit 110) may program the nftables with respect to assigning of exit IP addresses. For instance, the VSP control infrastructure 104 may program to select and/or assign exit IP addresses randomly or to select and/or assign exit IP addresses sequentially. Based at least in part on assigning the exit IP address to the user device 102, the VPN server 120 may store a correlation between the entry IP address and the exit IP address (being assigned to the user device 102) in a connection tracking table. In some aspects, there can be different mereological configurations of exit IPs addresses and sets (pools) of exit IP addresses. Mereology may be associated with parthood relationships. The aspects disclosed herein are not limited to a specific mereological system or ontology. Sets may be ordered, or unordered, or partially ordered, or aggregates of exit IP addresses. The relationship between exit IP addresses and sets may be described as reflexive or non-reflexive, transitive or non-transitive, symmetric, asymmetric, or antisymmetric, or any non-contradictory combination of these qualities. Set to set relations may be described under any set-axiomatic principles. None of these conceptions change the overall functioning of the disclosed aspects.

During the established VPN connection, the VPN server 120 may receive a plurality of data requests from the user device 102. For instance, based at least in part on the assigned entry IP address, as shown by reference numeral 210, the VPN server 120 may receive a first data request from the user device 102. In some aspects, the first data request may include a request for the VPN server 120 to retrieve and provide data of interest to the user device 102. For instance, the user device may send a first data request by using the browser installed on the user device 102 to initiate a connection to a website on the Internet, and thereby request the VPN server 120 to retrieve and provide first data of interest from a host device that is hosting the website. In some aspects, a communication interface (e.g., communication interface 770) in association with other components of the VPN server 120 and/or a VSP control infrastructure (e.g., VSP control infrastructure 104) may receive the plurality of data requests from the user device 102.

Based at least in part on receiving the first data request, as shown by reference numeral 220, the VPN server 120 may process the first data request. To process the first data request, the VPN server 120 may open a first socket between the VPN server 120 and the host device on the open Internet. Further, the VPN server 120 may use the first exit IP address to query the host device and retrieve the first data of interest. The VPN server 120 may use a correlation between the entry IP address and the first exit IP address to route the retrieved first data of interest to the user device 102. In some aspects, the correlation between the entry IP address and the first exit IP address may be privately or internally stored within the VPN server 120 in, for example, a connection tracking table. Based at least in part on receiving the retrieved first data of interest, the VPN server 120 may inspect the connection tracking table to determine the routing of the retrieved first data of interest. In some aspects, the correlation between the entry IP address and the first exit IP address may indicate that the first data of interest, retrieved using the first exit IP address, is to be routed to the user device 102, which transmitted the first data request to the entry IP address of the VPN server 120. In some aspects, a processor (e.g., processor 720) and a memory (e.g., memory 730) in association with other components of the VPN server 120 and/or a VSP control infrastructure (e.g., VSP control infrastructure 104) may process the first data request.

As shown by reference numeral 230, the VPN server 120 may receive a second data request from the user device 102 during the established VPN connection. In some aspects, the second data request may include a request for the VPN server 120 to retrieve and provide additional data of interest to the user device 102. For instance, the user device 102 may use the installed browser to request additional data from the website and/or may initiate a connection to a new website on the Internet, and thereby request the VPN server 120 to retrieve and provide second data of interest from an appropriate host device. In some aspects, a communication interface (e.g., communication interface 770) in association with other components of the VPN server 120 and/or a VSP control infrastructure (e.g., VSP control infrastructure 104) may receive the plurality of data requests from the user device 102.

Based at least in part on receiving the second data request, as shown by reference numeral 240, the VPN server 120 may rotate exit IP addresses. In some aspects, the VPN server 120 may rotate exit IP addresses by assigning another exit IP address (e.g., second exit IP address) to the user device 102 during the established VPN connection. The second exit IP address may be selected from among the plurality of exit IP addresses included in the pool of exit IP addresses available to the VPN server 120. In some aspects, the VPN server 120 may randomly select the second exit IP address from among the plurality of exit IP addresses included in the pool of exit IP addresses. In some aspects, the VPN server 120 may sequentially select the second exit IP address from among the plurality of exit IP addresses included in the pool of exit IP addresses. Sequentially selecting the second exit IP address may include selecting a next exit IP address from a predefined list of exit IP addresses. Further, the VPN server 120 may update a correlation between the entry IP address and the second exit IP address (being assigned to the user device 102) in the connection tracking table to enable the VPN server 120 to route the second data of interest to the user device 102. In some aspects, an IP address rotating device (e.g., IP address rotating device 350) may be associated with a processor (e.g., processor 720) and a memory (e.g., memory 730) in association with other components of the VPN server 120 and/or a VSP control infrastructure (e.g., VSP control infrastructure 104) to rotate exit IP addresses.

Based at least in part on assigning the second exit IP address, as shown by reference numeral 250, the VPN server 120 may process the second data request. To process the second data request, the VPN server 120 may use the second exit IP address to query the appropriate host device and retrieve the second data of interest. In some aspects, the VPN server 120 may utilize the previously opened first socket to retrieve the second data of interest. In an example, the VPN server 120 may utilize the previously opened first socket to query and retrieve additional data from the website hosted by the host device. In another example, the VPN server 120 may open a second socket between the VPN server 120 and the host device to retrieve the additional data from the website. In yet another example, the VPN server 120 may open a second socket between the VPN server 120 and a new host device that is hosting data associated with the new website. Further, the VPN server 120 may use the correlation between the entry IP address and the second exit IP address to route the retrieved second data of interest to the user device 102, in an analogous manner as discussed above with respect to routing of the retrieved first data of interest. In some aspects, the processing of the second data request may include the rotating of exit IP addresses. In some aspects, a processor (e.g., processor 720) and a memory (e.g., memory 730) in association with other components of the VPN server 120 and/or a VSP control infrastructure (e.g., VSP control infrastructure 104) may process the second data request.

In some aspects, the VPN server 120 may receive the first data request and the second data request at the same time. For instance, the VPN server 120 may receive the first data request and the second data request in the same communication from the user device 102. Alternatively, the VPN server 120 may receive the first data request and the second data request at different times. For instance, the VPN server 120 may deceive the first data request in a first communication and may deceive the second data request in a separate, second communication.

By rotating the exit IP addresses (e.g., assigning a plurality of exit IP addresses) during an established VPN connection, the VPN server 120 can deter tracking of exit IP addresses and, thereby, mitigate instances of private information associated with the user device 102 (e.g., a location of the user device 102, a list of websites visited using the user device 102, a nature of data requested by the user device 102, or the like) becoming compromised. As a result, the user device 102 may, among other things, protect its privacy and/or privately send and receive data across public networks.

As indicated above, FIG. 2 is provided as an example. Other examples may differ from what is described with regard to FIG. 2.

FIG. 3 is an illustration of an example 300 associated with rotating IP addresses in a VPN, according to various aspects of the present disclosure. Example 300 includes a user device 102 in communication with a VPN server 120 that is capable of retrieving requested data from one or more host devices 310 hosting one or more websites. The user device 102 may be in communication with the VPN server 120 based at least in part on establishing a VPN connection (e.g., secure tunnel) with the VPN server 120. The VPN server 120 may be associated with an entry IP address through which the user device 102 may access the VPN server 120, an IP address rotating device 320, and a plurality of exit IP addresses including, for example, a first exit IP address, a second exit IP address, a third exit IP address, a fourth exit IP address, and a fifth exit IP address. Each of the exit IP addresses may be from among a plurality of exit IP addresses included in a pool of exit IP addresses available to the VPN server 120. Although five exit IP addresses have been shown in FIG. 3, the present disclosure contemplates any number of exit IP addresses to be available to the VPN server 120. In some aspects, the exit IP addresses may be IPv4 IP address, IPv6 IP addresses, or the like. In some aspects, the VPN server 120 may include an encryption device 330 capable of encrypting and/or encapsulating data in the VPN. In some aspects, the encrypting and/or encapsulating may take place before rotating of the exit IP address by the IP address rotating device 320. In some aspects, the encrypting and/or encapsulating may take place after rotating of the exit IP address by the IP address rotating device 320.

Based at least in part on establishing the VPN connection, the VPN server 120 may assign, for example, the first exit IP address to the user device 102. In some aspects, the IP rotating device 320 may include and/or may be associated with an nftable to enable the IP rotating device 320 to assign, for example, the first exit IP address to the user device 102. In some aspects, as discussed above with respect to FIG. 2, the VPN server 120 may receive a first data request from the user device 102 during the established VPN connection. The first data request may be forwarded to the IP address rotating device 320. The IP address rotating device 320 may refer to an nftable to determine that the user device 102 is assigned the first exit IP address. In some aspects, the nftable may be stored in a memory (e.g., memory 730) associated with the VPN server 120. Based at least in part on determining that the user device 102 is assigned the first exit IP address, the VPN server 120 may determine that the first data request is to be processed using the first exit IP address.

As discussed above with respect to FIG. 2, the VPN server 120 may process the first data request. In some aspects, the VPN server 120 may open a first socket between the VPN server 120 and the one or more host devices 310. The VPN server may use the first exit IP address to query the host device and retrieve the first data of interest. Also, as discussed above with respect to FIG. 2, the VPN server 120 may use a correlation between the entry IP address and the first exit IP address to route the retrieved first data of interest to the user device 102.

The VPN server 120 may receive a second data request from the user device 102 during the established VPN connection. As discussed above with respect to FIG. 2, prior to processing the second data request, the IP address rotating device 320 may rotate exit IP addresses. In some aspects, the IP address rotating device 320 may rotate exit IP addresses by assigning the second exit IP address (or any other available exit IP address from the plurality of exit IP addresses) to the user device 102 during the established VPN connection. In some aspects, a processor associated with the VPN server 120 (e.g., a kernel processor) tracks open sockets, and based at least in part on a closing of a socket, the processor may indicate to the IP address rotating device 320 that exit IP addresses are to be rotated. The IP address rotating device 320 may randomly or sequentially select the second exit IP address from among the plurality of exit IP addresses, as discussed elsewhere herein. Further, the VPN server 120 may update a correlation between the entry IP address and the second exit IP address (being assigned to the user device 102) in the connection tracking table to enable the VPN server 120 to route the second data of interest to the user device 102. The VPN server 120 may process the second data request using the second exit IP address. In some aspects, the VPN server 120 may utilize the previously opened first socket to process the second data request. In some aspects, the VPN server 120 may open a second socket between the VPN server 120 and the one or more host devices 310 to process the second data request. Further, the VPN server 120 may use the updated correlation between the entry IP address and the second exit IP address to route the retrieved second data of interest to the user device 102.

As indicated above, FIG. 3 is provided as an example. Other examples may differ from what is described with regard to FIG. 3.

FIG. 4 is an illustration of an example 400 associated with rotating IP addresses in a VPN, according to various aspects of the present disclosure. Example 400 includes a user device 102 in communication with VPN server 1 120 that is capable of retrieving requested data from one or more host devices 410 hosting one or more websites and of securely communicating (e.g., via respective encryption tunnels) with VPN server 2 120 and/or VPN server 3 120 that are also capable of retrieving requested data from the one or more host devices 410. In some aspects, communication between the VPN Server 1 120 and other VPN servers can take place over, for example, proxy protocol v2, IP in IP (Protocol 4): IP in IPv4/IPv6; SIT/IPv6 (Protocol 41): IPv6 in IPv4/IPv6; GRE (Protocol 47): Generic Routing Encapsulation; OpenVPN (UDP port 1194); SSTP (TCP port 443): Secure Socket Tunneling Protocol; IPSec (Protocol 50 and 51): Internet Protocol Security; L2TP (Protocol 115): Layer 2 Tunneling Protocol; VXLAN (UDP port 4789): Virtual Extensible Local Area Network; WireGuard; Quic, and other available data communication protocols and their future iterations.

The user device 102 may be in communication with the VPN server 1 120 based at least in part on establishing a VPN connection (e.g., secure tunnel) with the VPN server 1 120. The VPN server 1 120 may be associated with a first entry IP address through which the user device 102 may access the VPN server 1 120, an IP address rotating device 1 320, an encryption device 1 330, and a plurality of exit IP addresses including, for example, a first exit IP address, a second exit IP address, and a third exit IP address. The VPN server 2 120 may be associated with a second entry IP address through which the VPN server 1 120 may access the VPN server 2 120, an IP address rotating device 2 320, an encryption device 2 330, and a plurality of exit IP addresses including, for example, a fourth exit IP address, a fifth exit IP address, and a sixth exit IP address. Similarly, the VPN server 3 120 may be associated with a third entry IP address through which the VPN server 1 120 may access the VPN server 3 120, an IP address rotating device 3 320, an encryption device 3 330, and a plurality of exit IP addresses including, for example, a seventh exit IP address, an eighth exit IP address, and a ninth exit IP address. Each of the exit IP addresses may be from among a plurality of exit IP addresses included in a pool of exit IP addresses available to the respective VPN servers 120. Although the VPN servers 120 are shown to be associated with three exit IP addresses in FIG. 4, the present disclosure contemplates any number of exit IP addresses to be available to the VPN servers 120. In some aspects, the respective encryption devices 330 may be capable of encrypting and/or encapsulating data before rotating of the exit IP address via the respective IP address rotating devices 320. In some aspects, the respective encryption devices 330 may be capable of encrypting and/or encapsulating data after rotating of the exit IP address via the respective IP address rotating devices 320.

In some aspects, the VPN server 1 120 may be analogous to the VPN server 120 discussed above with respect to FIG. 3. For instance, during the established VPN connection, the VPN server 1 120 may process a first data request and/or a second data request by utilizing the IP address rotating device 1 320 to rotate exit IP addresses among the first exit IP address, the second exit IP address, and the third exit IP address in an analogous manner as discussed above with respect to FIG. 3.

In some aspects, the VPN server 1 120 may be a primary VPN server and the VPN server 2 120 and the VPN server 3 120 may be secondary VPN servers. In some aspects, the VPN server 1 120 may be analogous to the VPN server 2 120 and/or the VPN server 3 120, and either of these VPN servers may operate as the primary VPN server or the secondary VPN server. In some aspects, the primary VPN server and the secondary VPN servers may be located in various geographic locations. Although two secondary VPN servers are shown in FIG. 4, the present disclosure contemplates the use of any number of secondary VPN servers for processing of data requests received from the user device 102. In some aspects, the primary VPN server may use an nftable to connect with the secondary VPN servers.

Additionally, or alternatively, during the established VPN connection, the IP address rotating device 1 320 may process the first data request and/or the second data request by forwarding the first data request and/or the second data request to the VPN server 2 120 and/or the VPN server 3 120. In an example, the IP address rotating device 1 320 may forward the first data request and the second data request to the second entry IP address of the VPN server 2 120 or to the third entry IP address of the VPN server 3 120. In another example, the IP address rotating device 1 320 may forward the first data request to the second entry IP address of the VPN server 2 120 and may forward the second data request to the third entry IP address of the VPN server 3 120. In yet another example, the IP address rotating device 1 320 may process the first data request by using, for example, the first exit IP address and may forward the second data request to the second entry IP address of the VPN server 2 120 or to the third entry IP address of the VPN server 3 120. In some aspects, the present disclosure contemplates any combination of the VPN server 1 120, the VPN server 2 120, and the VPN server 3 120 processing the first data request and/or the second data request.

Based at least in part on receiving a forwarded data request (e.g., first data request and/or second data request) from the primary VPN server, a secondary VPN server (e.g., VPN server 2 120 or VPN server 3 120) may process the forwarded data request in an analogous manner to a server processing a data request, as discussed above with respect to FIG. 3. In other words, the secondary VPN server may process the received data request by rotating exit IP addresses available to the secondary VPN server, as discussed above with respect to FIG. 3. In some aspects, the secondary VPN server may retrieve data of interest from the one or more host devices 410 and utilize a connection tracking table internal to the secondary VPN server to route the retrieved data of interest to the primary VPN server, which may utilize a connection tracking table internal to the primary VPN server to route the retrieved data of interest to the user device 102. The connection tracking table internal to the secondary VPN server may include a correlation of the entry IP address of the secondary VPN server and an exit IP address of the primary VPN server. The connection tracking table internal to the primary VPN server may include a correlation of the entry IP address of the primary VPN server and the user device 102. In some aspects, the primary VPN server may use a first socket to process or forward the first data request and the second data request. In some aspects, the primary VPN server may use a first socket to process or forward the first data request and use a second, different socket to process or forward the second data request. In some aspects, a secondary VPN server may use a first socket to process the first data request and the second data request. In some aspects, the secondary VPN server may use a first socket to process the first data request and use a second, different socket to process the second data request.

By utilizing a secondary VPN server to process the received data request during the established VPN connection (with the primary VPN server), dual encryption of information included in a data request may be achieved. Dual encryption may include encryption by the encryption device 1 330 and by encryption device 2 330 or encryption device 3 330. By enabling rotation of exit IP addresses and/or utilizing a secondary VPN server, tracking of exit IP addresses can be deterred and private information associated with the user device 102 may be protected.

As indicated above, FIG. 4 is provided as an example. Other examples may differ from what is described with regard to FIG. 4.

FIG. 5 is an illustration of an example 500 associated with rotating IP addresses in a VPN, according to various aspects of the present disclosure. Example 500 includes a user device 102 in communication with VPN server 1 120 that is capable securely communicating (e.g., via respective encryption tunnels) with VPN server 2 120, the VPN server 3 120, and/or VPN server 4 120 that are capable of retrieving requested data from the one or more host devices 510.

The user device 102 may be in communication with the VPN server 1 120 based at least in part on establishing a VPN connection (e.g., secure tunnel) with the VPN server 1 120. The VPN server 1 120 may be associated with a first entry IP address through which the user device 102 may access the VPN server 1 120, an IP address rotating device 1 320, and an encryption device 1 330. The VPN server 2 120 may be associated with a second entry IP address through which the VPN server 1 120 may access the VPN server 2 120, an IP address rotating device 2 320, an encryption device 2 330, and a plurality of exit IP addresses including, for example, a first exit IP address, a second exit IP address, and a third exit IP address. Similarly, the VPN server 3 120 may be associated with a third entry IP address through which the VPN server 1 120 may access the VPN server 3 120, an IP address rotating device 3 320, an encryption device 3 330, and a plurality of exit IP addresses including, for example, a fourth exit IP address, a fifth exit IP address, and a sixth exit IP address. Similarly, the VPN server 4 120 may be associated with a fourth entry IP address through which the VPN server 1 120 may access the VPN server 4 120, an IP address rotating device 4 320, an encryption device 4 330, and a plurality of exit IP addresses including, for example, a seventh exit IP address, an eighth exit IP address, and a ninth exit IP address. Each of the exit IP addresses may be from among a plurality of exit IP address included in a pool of exit IP addresses available to the respective VPN servers 120. Although the VPN servers 120 are shown to be associated with three exit IP addresses in FIG. 4, the present disclosure contemplates any number of exit IP addresses to be available to the VPN servers 120. In some aspects, the respective encryption devices 330 may be capable of encrypting and/or encapsulating data before rotating of the exit IP address by the respective IP address rotating devices 320. In some aspects, the respective encryption devices 330 may be capable of encrypting and/or encapsulating data after rotating of the exit IP address by the respective IP address rotating devices 320.

The VPN server 1 120 may be a primary VPN server and the VPN server 2 120, the VPN server 3 120, and the VPN server 4 120 may be secondary VPN servers. In some aspects, the primary VPN server (e.g., VPN server 1 120) may be analogous to the primary VPN server 120 discussed above with respect to FIGS. 3 and 4 and the secondary VPN servers (e.g., VPN server 2 120, the VPN server 3 120, and the VPN server 4 120) may be analogous to the secondary VPN servers discussed above with respect to FIG. 4. Although three secondary VPN servers are shown in FIG. 5, the present disclosure contemplates the use of any number of secondary VPN servers for processing of data requests received from the user device 102.

During the established VPN connection with the primary VPN server, the IP address rotating device 1 320 may process the first data request and/or the second data request by forwarding the first data request and/or the second data request to the VPN server 2 120, the VPN server 3 120, and/or the VPN server 4 120. In an example, the IP address rotating device 1 320 may forward the first data request and the second data request to the second entry IP address of the VPN server 2 120 or to the third entry IP address of the VPN server 3 120. In another example, the IP address rotating device 1 320 may forward the first data request to the fourth entry IP address of the VPN server 4 120 and may forward the second data request to the second entry IP address of the VPN server 2 120. In some aspects, the present disclosure contemplates the IP address rotating device 1 320 forwarding the first data request and/or the second data request to any combination of the VPN server 2 120, the VPN server 3 120, and/or the VPN server 4 120 for processing the first data request and/or the second data request.

Based at least in part on receiving a data request (e.g., first data request and/or second data request), a secondary VPN server (e.g., VPN server 2 120, VPN server 3 120, or VPN server 4 120) may process the received data request in an analogous manner as discussed above with respect to FIG. 4. In other words, the secondary VPN server may process the received data request by rotating exit IP addresses available to the secondary VPN server, as discussed above with respect to FIG. 4. In some aspects, the secondary VPN server may retrieve data of interest from the one or more host devices 510 and utilize a connection tracking table internal to the secondary VPN server to route the retrieved data of interest to the primary VPN server, which may utilize a connection tracking table internal to the primary VPN server to route the retrieved data of interest to the user device 102. The connection tracking table internal to the secondary VPN server may include a correlation of the entry IP address of the secondary VPN server and an exit IP address of the primary VPN server. The connection tracking table internal to the primary VPN server may include a correlation of the entry IP address of the primary VPN server and the user device 102. In some aspects, the primary VPN server may use a first socket to forward the first data request and the second data request. In some aspects, the primary VPN server may use a first socket to forward the first data request and use a second, different socket to forward the second data request. In some aspects, a secondary VPN server may use a first socket to process the first data request and the second data request. In some aspects, the secondary VPN server may use a first socket to process the first data request and use a second, different socket to process the second data request.

As indicated above, FIG. 5 is provided as an example. Other examples may differ from what is described with regard to FIG. 5.

FIG. 6 is an illustration of an example process 600 associated with rotating exit IP addresses in a VPN, according to various aspects of the present disclosure. In some aspects, the process 600 may be performed by a memory (e.g., memory 830) and a processor (e.g., processor 820) associated with a VPN server (e.g., primary VPN server or secondary VPN server) and/or an associated VSP control infrastructure. As shown by reference numeral 610, process 600 includes receiving, at a primary VPN server during an established VPN connection, a first data request and a second data request from a user device. For instance, the VPN server may utilize an associated communication interface (e.g., communication interface 870) and a processor/controller (e.g., processor 820) to receive, at a primary VPN server during an established VPN connection, a first data request and a second data request from a user device, as discussed elsewhere herein.

As shown by reference numeral 620, process 600 includes retrieving, during the established VPN connection, first data associated with the first data request using a first exit IP address. For instance, the VPN server may utilize the communication interface (e.g., communication interface 870) and the associated memory and processor to retrieve, during the established VPN connection, first data associated with the first data request using a first exit IP address, as discussed elsewhere herein. In some aspects, the VPN server may utilize the communication interface (e.g., communication interface 870) to communicate with a host device to query and retrieve data associated with the one or more data requests. Further, the VPN server may include an IP address rotating device in association with a memory (e.g., memory 830) and a processor (e.g., processor 820) to determine that the first exit IP address is to be used to retrieve data associated with the first data request.

As shown by reference numeral 630, process 600 includes retrieving, during the established VPN connection, second data associated with the second data request using a second exit IP address, different from the first exit IP address. For instance, the VPN server may utilize the communication interface (e.g., communication interface 870) and the associated memory and processor to retrieve, during the established VPN connection, second data associated with the second data request using a second exit IP address, different from the first exit IP address. In some aspects, the VPN server may utilize the communication interface (e.g., communication interface 870) to communicate with a host device to query and retrieve data associated with the one or more data requests. Further, the VPN server may include an IP address rotating device in association with a memory (e.g., memory 830) and a processor (e.g., processor 820) to rotate exit IP address and determine that the second exit IP address is to be used to retrieve data associated with the second data request.

Process 600 may include additional aspects, such as any single aspect or any combination of aspects described below and/or in connection with one or more other processes described elsewhere herein.

In a first aspect, wherein, in process 600, retrieving the first data includes retrieving the first data in association with a second VPN server, or retrieving the second data includes retrieving the second data in association with the second VPN server.

In a second aspect, alone or in combination with the first aspect, wherein, in process 600, the first exit IP address and the second exit IP address are from among a pool of exit IP addresses available to the primary VPN server.

In a third aspect, alone or in combination with the first through second aspects, wherein, in process 600, the second exit IP address is randomly selected from a pool of exit IP address available to the primary VPN server.

In a fourth aspect, alone or in combination with the first through third aspects, wherein, in process 600, the second exit IP address is sequentially selected from a pool of exit IP address available to the primary VPN server.

In a fifth aspect, alone or in combination with the first through fourth aspects, wherein, in process 600, retrieving the first data includes retrieving the first data using a first socket and retrieving the second data includes retrieving the second data using the first socket.

In a sixth aspect, alone or in combination with the first through fifth aspects, wherein, in process 600, retrieving the first data includes retrieving the first data using a first socket and retrieving the second data includes retrieving the second data using a second socket, different from the first socket.

In a seventh aspect, alone or in combination with the first through sixth aspects, process 600 includes transmitting the first data or the second data to the user device based at least in part on a correlation between an entry IP address and the first exit IP address or the second exit IP address.

In an eighth aspect, alone or in combination with the first through seventh aspects, wherein, in process 600, receiving the second data request includes receiving the second data request after retrieving the first data associated with the first data request.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of an example process 700 associated with rotating exit IP addresses in a VPN, according to various aspects of the present disclosure. In some aspects, the process 700 may be performed by a memory (e.g., memory 830) and a processor (e.g., processor 820) associated with a VPN server (e.g., primary VPN server or secondary VPN server) and/or an associated VSP control infrastructure. As shown by reference numeral 710, process 700 includes receiving, at a first VPN server, a first data request and a second data request during an established VPN connection between a user device and a second VPN server. For instance, the VPN server may utilize an associated communication interface (e.g., communication interface 870) and a processor/controller (e.g., processor 820) to receive, at a first VPN server, a first data request and a second data request during an established VPN connection between a user device and a second VPN server.

As shown by reference numeral 720, process 700 includes retrieving, during the established VPN connection, first data associated with the first data request using a first exit IP address. For instance, the VPN server may utilize the associated communication interface, memory, and processor to retrieve, during the established VPN connection, first data associated with the first data request using a first exit IP address, as discussed elsewhere herein. In some aspects, the VPN server may utilize the communication interface to communicate with a host device to query and retrieve data associated with the one or more data requests. Further, the VPN server may include an IP address rotating device in association with the memory and the processor to determine that the first exit IP address is to be used to retrieve data associated with the first data request.

As shown by reference numeral 730, process 700 includes retrieving, during the established VPN connection, second data associated with the second data request using a second exit IP address, different from the first exit IP address. For instance, the VPN server may utilize the associated communication interface, memory, and processor to retrieve, during the established VPN connection, second data associated with the second data request using a second exit IP address, different from the first exit IP address. In some aspects, the VPN server may utilize the communication interface to communicate with a host device to query and retrieve data associated with the one or more data requests. Further, the VPN server may include an IP address rotating device in association with the memory and the processor to rotate exit IP address and determine that the second exit IP address is to be used to retrieve data associated with the second data request.

Process 700 may include additional aspects, such as any single aspect or any combination of aspects described below and/or in connection with one or more other processes described elsewhere herein.

In a first aspect, wherein, in process 700, the first exit IP address and the second exit IP address are from among a pool of exit IP addresses available to the first VPN server.

In a second aspect, alone or in combination with the first aspect, wherein, in process 700, the second exit IP address is randomly selected from a pool of exit IP address available to the first VPN server.

In a third aspect, alone or in combination with the first through second aspects, wherein, in process 700, the second exit IP address is sequentially selected from a pool of exit IP address available to the first VPN server.

In a fourth aspect, alone or in combination with the first through third aspects, wherein, in process 700, retrieving the first data includes retrieving the first data using a first socket and retrieving the second data includes retrieving the second data using the first socket.

In a fifth aspect, alone or in combination with the first through fourth aspects, wherein, in process 700, retrieving the first data includes retrieving the first data using a first socket and retrieving the second data includes retrieving the second data using a second socket, different from the first socket.

In a sixth aspect, alone or in combination with the first through fifth aspects, in process 700, transmitting the first data or the second data to the second VPN server based at least in part on a correlation between an entry IP address and the first exit IP address or the second exit IP address.

In a seventh aspect, alone or in combination with the first through sixth aspects, in process 700, receiving the second data request includes receiving the second data request after retrieving the first data associated with the first data request.

Although FIG. 7 shows example blocks of the process, in some aspects, the process may include additional blocks, fewer blocks, different blocks, or differently arranged blocks than those depicted in FIG. 7. Additionally, or alternatively, two or more of the blocks of the process may be performed in parallel.

As indicated above, FIG. 7 is provided as an example. Other examples may differ from what is described with regard to FIG. 7.

FIG. 8 is an illustration of example devices 800, according to various aspects of the present disclosure. In some aspects, the example devices 800 may form part of or implement the systems, environments, infrastructures, components, devices or the like described elsewhere herein (e.g., VPN server, IP address rotating device, encryption device, etc.). The example devices 800 may include a universal bus 810 communicatively coupling a processor 820, a memory 830, a storage component 840, an input component 850, an output component 860, and a communication interface 870.

Bus 810 may include a component that permits communication among multiple components of a device 800. Processor 820 may be implemented in hardware, firmware, and/or a combination of hardware and software. Processor 820 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 820 may include one or more processors capable of being programmed to perform a function. Memory 830 may include a random access memory (RAM), a read only memory (ROM), and/or another type of dynamic or static storage device (e.g., a flash memory, a magnetic memory, and/or an optical memory) that stores information and/or instructions for use by processor 820.

Storage component 840 may store information and/or software related to the operation and use of a device 800. For example, storage component 840 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 850 may include a component that permits a device 800 to receive information, such as via user input (e.g., a touch screen display, a keyboard, a keypad, a mouse, a button, a switch, and/or a microphone). Additionally, or alternatively, input component 850 may include a component for determining location (e.g., a global positioning system (GPS) component) and/or a sensor (e.g., an accelerometer, a gyroscope, an actuator, another type of positional or environmental sensor, and/or the like). Output component 860 may include a component that provides output information from device 800 (via, for example, a display, a speaker, a haptic feedback component, an audio or visual indicator, and/or the like).

Communication interface 870 may include a transceiver-like component (e.g., a transceiver, a separate receiver, a separate transmitter, and/or the like) that enables a device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, and/or the like.

A device 800 may perform one or more processes described elsewhere herein. A device 800 may perform these processes based on processor 820 executing software instructions stored by a non-transitory computer-readable medium, such as memory 830 and/or storage component 840. As used herein, the term "computer-readable medium" may refer to a non-transitory memory device. A memory device may include memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 8 are provided as an example. In practice, a device 800 may include additional components, fewer components, different components, or differently arranged components than those shown in FIG. 8. Additionally, or alternatively, a set of components (e.g., one or more components) of a device 800 may perform one or more functions described as being performed by another set of components of a device 800.

As indicated above, FIG. 8 is provided as an example. Other examples may differ from what is described with regard to FIG. 8.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, at a first virtual private network (VPN) server during an established VPN connection, a first data request and a second data request from a user device;
    transmitting, by the first VPN server during the established VPN connection, the first data request to a second VPN server and the second data request to a third VPN server;
    receiving, by the first VPN server from the second VPN server during the established VPN connection, first data associated with the first data request, the first data being retrieved by the second VPN server using a first exit internet protocol (IP) address associated with the second VPN server; and
    receiving, by the first VPN server from the third VPN server during the established VPN connection, second data associated with the second data request, the second data being retrieved by the third VPN server using a second exit IP address associated with the third VPN server, the second exit IP address being different from the first exit IP address.

2. The method of claim 1, wherein
    transmitting the first data request includes transmitting the first data request by utilizing an entry IP address associated with the second VPN server, and
    transmitting the second data request includes transmitting the second data request by utilizing an entry IP address associated with the third VPN server.

3. The method of claim 1, further comprising:
    retrieving, during the established VPN connection, third data associated with a third data request using a third exit IP address associated with the first VPN server, the third exit IP address being different from the first exit IP address and the second exit IP address.

4. The method of claim 1, further comprising:
transmitting the first data to the user device based at least in part on a correlation between an entry IP address associated with the first VPN server and the first exit IP address, or
transmitting the second data to the user device based at least in part on a correlation between the entry IP address associated with the first VPN server and the second exit IP address.

5. The method of claim 1, wherein the first exit IP address is selected from a pool of exit IP addresses available to the second VPN server or the second exit IP address is selected from a pool of exit IP addresses available to the third VPN server.

6. The method of claim 1, wherein the first exit IP address is randomly selected from a pool of exit IP addresses available to the second VPN server or the second exit IP address is randomly selected from a pool of exit IP addresses available to the third VPN server.

7. The method of claim 1, wherein the first exit IP address is sequentially selected from a pool of exit IP addresses available to the second VPN server or the second exit IP address is sequentially selected from a pool of exit IP addresses available to the third VPN server.

8. A device associated with a first virtual private network (VPN) server, the device comprising:
a memory; and
a processor communicatively coupled to the memory, the memory and the processor being configured to:
receive, during an established VPN connection, a first data request and a second data request from a user device;
transmit, during the established VPN connection, the first data request to a second VPN server and the second data request to a third VPN server;
receive, from the second VPN server during the established VPN connection, first data associated with the first data request, the first data being retrieved by the second VPN server using a first exit internet protocol (IP) address associated with the second VPN server; and
receive, from the third VPN server during the established VPN connection, second data associated with the second data request, the second data being retrieved by the third VPN server using a second exit IP address associated with the third VPN server, the second exit IP address being different from the first exit IP address.

9. The device of claim 8, wherein,
to transmit the first data request, the memory and the processor are configured to transmit the first data request by utilizing an entry IP address associated with the second VPN server, and
to transmit the second data request, the memory and the processor are configured to transmit the second data request by utilizing an entry IP address associated with the third VPN server.

10. The device of claim 8, wherein the memory and processor are configured to:
retrieve, during the established VPN connection, third data associated with a third data request using a third exit IP address associated with the first VPN server, the third exit IP address being different from the first exit IP address and the second exit IP address.

11. The device of claim 8, wherein the memory and the processor are configured to:
transmit the first data to the user device based at least in part on a correlation between an entry IP address associated with the first VPN server and the first exit IP address, or
transmit the second data to the user device based at least in part on a correlation between the entry IP address associated with the first VPN server and the second exit IP address.

12. The device of claim 8, wherein the first exit IP address is selected from a pool of exit IP addresses available to the second VPN server or the second exit IP address is selected from a pool of exit IP addresses available to the third VPN server.

13. The device of claim 8, wherein the first exit IP address is randomly selected from a pool of exit IP addresses available to the second VPN server or the second exit IP address is randomly selected from a pool of exit IP addresses available to the third VPN server.

14. The device of claim 8, wherein the first exit IP address is sequentially selected from a pool of exit IP addresses available to the second VPN server or the second exit IP address is sequentially selected from a pool of exit IP addresses available to the third VPN server.

15. A non-transitory computer-readable medium configured to store instructions, which when executed by a processor associated with a first virtual private network (VPN), cause the processor to:
receive, during an established VPN connection, a first data request and a second data request from a user device;
transmit, during the established VPN connection, the first data request to a second VPN server and the second data request to a third VPN server;
receive, from the second VPN server during the established VPN connection, first data associated with the first data request, the first data being retrieved by the second VPN server using a first exit internet protocol (IP) address associated with the second VPN server; and
receive, from the third VPN server during the established VPN connection, second data associated with the second data request, the second data being retrieved by the third VPN server using a second exit IP address associated with the third VPN server, the second exit IP address being different from the first exit IP address.

16. The non-transitory computer-readable medium of claim 15, wherein,
to transmit the first data request, the processor is configured to transmit the first data request by utilizing an entry IP address associated with the second VPN server, and
to transmit the second data request, the processor is configured to transmit the second data request by utilizing an entry IP address associated with the third VPN server.

17. The non-transitory computer-readable medium of claim 15, wherein the processor is configured to:
retrieve, during the established VPN connection, third data associated with a third data request using a third exit IP address associated with the first VPN server, the third exit IP address being different from the first exit IP address and the second exit IP address.

18. The non-transitory computer-readable medium of claim 15, wherein the processor is configured to:

transmit the first data to the user device based at least in part on a correlation between an entry IP address associated with the first VPN server and the first exit IP address, or transmit the second data to the user device based at least in part on a correlation between the entry IP address associated with the first VPN server and the second exit IP address.

19. The non-transitory computer-readable medium of claim 15, wherein the first exit IP address is selected from a pool of exit IP addresses available to the second VPN server or the second exit IP address is selected from a pool of exit IP addresses available to the third VPN server.

20. The non-transitory computer-readable medium of claim 15, wherein the first exit IP address is randomly or sequentially selected from a pool of exit IP addresses available to the second VPN server, or the second exit IP address is randomly or sequentially selected from a pool of exit IP addresses available to the third VPN server.

\* \* \* \* \*